(12) United States Patent
Butzmann et al.

(10) Patent No.: US 10,734,870 B2
(45) Date of Patent: Aug. 4, 2020

(54) ELECTRIC DRIVE SYSTEM

(71) Applicant: BERGISCHE UNIVERSITAET WUPPERTAL, Wuppertal (DE)

(72) Inventors: Stefan Butzmann, Schalksmuehle (DE); Marius Finke, Cologne (DE)

(73) Assignee: BERGISCHE UNIVERSITAET WUPPERTAL, Wuppertal (DE)

( * ) Notice: Subject to any disclaimer, the term of this patent is extended or adjusted under 35 U.S.C. 154(b) by 72 days.

(21) Appl. No.: 15/764,146

(22) PCT Filed: Oct. 25, 2016

(86) PCT No.: PCT/EP2016/001768
§ 371 (c)(1),
(2) Date: May 1, 2018

(87) PCT Pub. No.: WO2017/080631
PCT Pub. Date: May 18, 2017

(65) Prior Publication Data
US 2019/0058377 A1 Feb. 21, 2019

(30) Foreign Application Priority Data

Nov. 11, 2015 (DE) .................. 10 2015 014 509

(51) Int. Cl.
| | |
|---|---|
| *H02K 11/33* | (2016.01) |
| *H01M 2/10* | (2006.01) |
| *H02K 9/20* | (2006.01) |
| *H02K 11/00* | (2016.01) |
| *H02K 11/215* | (2016.01) |
| *B60L 50/50* | (2019.01) |
| *B60L 50/64* | (2019.01) |

(Continued)

(52) U.S. Cl.
CPC ............. *H02K 11/33* (2016.01); *B60L 50/50* (2019.02); *B60L 50/64* (2019.02); *H01M 2/1077* (2013.01); *H01M 2/1083* (2013.01); *H02K 5/22* (2013.01); *H02K 7/003* (2013.01); *H02K 9/20* (2013.01); *H02K 11/0094* (2013.01); *H02K 11/215* (2016.01); *B60L 2220/50* (2013.01); *H01M 2220/20* (2013.01); *H02K 9/22* (2013.01); *H02K 2213/06* (2013.01); *H02K 2213/12* (2013.01)

(58) Field of Classification Search
CPC ............ H02K 5/04; H02K 5/22; H02K 7/145; H02K 11/215; H02K 11/33; H01M 2/1083; H01M 2/1077
USPC ................................... 310/47, 50, 68 R, 428
See application file for complete search history.

(56) References Cited

U.S. PATENT DOCUMENTS

| | | | | |
|---|---|---|---|---|
| 4,013,907 | A | | 3/1977 | Mabuchi |
| 5,227,263 | A | * | 7/1993 | Blier .................... H01M 2/1055 429/100 |

(Continued)

FOREIGN PATENT DOCUMENTS

EP 2343752 A 7/2011

Primary Examiner — John K Kim
Assistant Examiner — Minki Chang
(74) Attorney, Agent, or Firm — Andrew Wilford

(57) ABSTRACT

The heat pipes 9a provided here in the grooves 9 of the motor side conduct heat to the end of the output shaft 2 and the heat pipes 10a in the grooves 10 of the housing of the power supply to the opposite end. A flow of heat to axially opposing ends is thus produced that always travels away from the power electronics that are arranged approximately in the center of the system.

19 Claims, 3 Drawing Sheets

Figure 1:
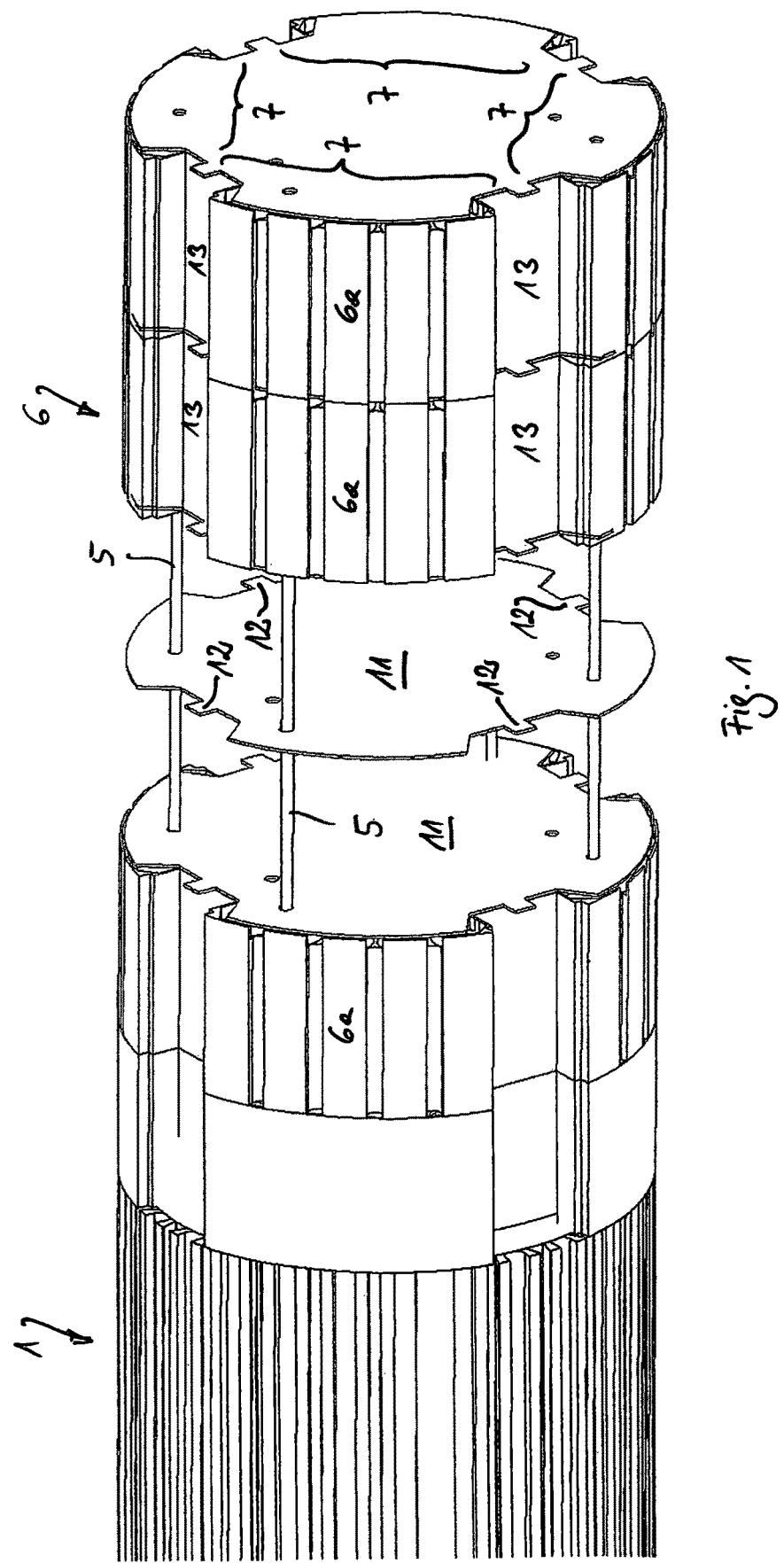

(51) Int. Cl.
    *H02K 5/22*    (2006.01)
    *H02K 7/00*    (2006.01)
    *H02K 9/22*    (2006.01)

(56) References Cited

U.S. PATENT DOCUMENTS

| | | | |
|---|---|---|---|
| 6,037,690 A | | 3/2000 | Hill |
| RE43,232 E | * | 3/2012 | Pyntikov ................ B60L 50/64 |
| | | | 180/220 |
| 9,774,019 B2 | | 9/2017 | Walpurgis |
| 2003/0173857 A1 | * | 9/2003 | Jones ....................... H02K 3/02 |
| | | | 29/596 |
| 2005/0184689 A1 | * | 8/2005 | Maslov .................... B60L 8/00 |
| | | | 318/400.41 |
| 2006/0091858 A1 | * | 5/2006 | Johnson .................... B25F 5/00 |
| | | | 320/128 |
| 2014/0191624 A1 | * | 7/2014 | Jahshan ................ H02K 11/33 |
| | | | 310/68 B |
| 2015/0130312 A1 | * | 5/2015 | Golka ..................... H02K 1/185 |
| | | | 310/89 |
| 2017/0025723 A1 | | 1/2017 | Osazaki |
| 2018/0294694 A1 | * | 10/2018 | Butzmann ................ B60K 1/04 |

\* cited by examiner

ELECTRIC DRIVE SYSTEM

CROSS REFERENCE TO RELATED APPLICATIONS

This application is the US-national stage of PCT application PCT/EP2016/001768 filed 25 Oct. 2016 and claiming the priority of German patent application 102015014509.6 itself filed 11 Nov. 2015.

The invention relates to electric drive systems, particularly for automobiles, comprising an electric motor and a power supply, particularly including a pulse inverter and power electronics.

In terms of the power supply, today's drive systems of this type usually comprise power-storage cells such as for example batteries, which are understood to particularly include those of the rechargeable type, such as lithium polymer rechargeable batteries. In addition, pulse inverters are frequently provided in such drive systems.

Here, power-storage cells have the job of supplying the energy required to operate the drive system, particularly powering an automobile, and to store it while charging. The pulse inverter converts the direct voltage supplied by the battery into what is usually a three-phase alternating voltage that can power an electric motor, a synchronous or asynchronous machine for example, via the power electronics that assume control of the stator windings.

The power-storage cells, pulse inverter, and power electronics are usually manufactured independent of one another and constitute autonomous units that are interconnected via cable harnesses. In designing the system, a suitable compromise must always be found between the magnitude of the currents flowing in the system and the voltage level.

For a drive system with an output of for example 100 kW, the battery could be designed either with a DC voltage of 100 V and an output current of about 1000 A or with higher voltages and commensurately lower currents.

For example, in the area of application of today's electric vehicles, a voltage level of about 400-600 V has currently become accepted, which results in currents in the range of a few hundred amperes. Low voltages and higher currents cannot be practically used in previous drive systems, since the cross sections of the current-carrying cable and motor windings would need to increase massively, which would result in an increase in vehicle weight and costs.

In the prior art, a voltage level of typically >400 V continues to pose substantial challenges in terms of the electrical safety of such systems and is associated with substantial effort and expense with regard to the insulation of the individual components of the vehicle chassis and the corresponding monitoring of the insulation.

With reference to VDE norms, this effort and expense could be reduced only for voltages of <60 V. However, the markedly increased currents required for this cannot be managed economically in the previous drive systems due to the distances to be bridged over and the line cross sections required for this.

One essential criterion in designing an electrical or hybrid drive for automobiles is the volumetric energy or power density, that is, the volume of the electrical drive train relative to the energy content (which represents a measure for the range of the vehicle) and relative to the weight of the drive train.

Against the background of the above requirements, it is an object of the invention to provide such an electric drive such that it is as compact as possible (that is, with minimal volume) and to provide such a drive system that reduces the distances to be bridged between the power supply and the electric motor being operated.

Moreover, it is preferably also an object of the invention to provide a drive system is redundant with respect to the power supply and, more preferably, can be operated at substantially reduced voltages compared to today's typical voltage level, particularly with phase voltages of less than or equal to 60 V, in order to minimize the insulation requirements and thus also the required distances between the individual subcomponents and hence ultimately also the costs.

This object is achieved according to the invention by arranging the power supply axially adjacent the electric motor and angularly around the axis of rotation of the electric motor. Here, the axis of rotation is not understood to be the shaft, but rather the mathematical middle axis in the midpoint of the motor shaft. The extension of the power supply and/or of a housing containing same need not necessarily occur over the full peripheral angle of 360°, but such a provision is preferably made, thus resulting in a fully cylindrical power supply axially and laterally next to the electric motor in this case.

Preferably, the power supply is understood to be a unit that contains the energy to be utilized, meaning particularly that a power supply does not have a mere forwarding or conductive function for energy originating from the outside.

The essential idea of the invention is to bring the power supply spatially as close as possible to the electric motor. By putting it axially adjacent the electric motor, particularly so as to be immediately adjacent the electric motor or with interposition of only an intermediate element, preferably on an axial front end/front face of the electric motor, the only necessity that remains, if at all, apart from the internal current paths, is to conduct the power from the power supply axially through the electric motor and/or of the power supply and, as needed, radially between the stator connections and the power supply. The distances to be bridged over are thus obviously reduced substantially compared to the prior art.

Even if such a drive system is operated at the voltages that have been used previously, substantial advantages are already achieved, although the invention also includes the possibility of reducing the voltage level, since increased conductor cross sections for conducting unchanged output become manageable in the shortened conduction paths.

In a preferred embodiment, the power supply, more particularly a preferably cylindrical housing containing it, can be secured to an axial front face of the motor housing, for example on the front face that is opposite the motor output shaft. In this case, no center axial opening is required in the housing of the power supply in order to pass the motor shaft through, meaning that even the central part of the housing can be used for the power supply, for example battery cells.

It is also possible, however, for the motor output shaft to pass through the power supply, particularly through the housing containing it, which particularly enables the power supply to surround the motor output shaft circumferentially. In this case, the housing of the power supply will have a preferably central opening in which the motor shaft is arranged.

In all of its embodiments, the invention can hold the power supply, particularly the energy-storage cells (battery cells) required for it, in a cylindrical housing that is also cylindrically tubular when a shaft passes through it. Preferably, the cylinder axis of the power supply, more particularly of its housing, and the motor axis are coaxial.

An arrangement is also preferred in which the axial length of the power supply, more particularly of its housing, is at least substantially equal to the axial length of the motor housing, and corresponds to up to 150% of the length thereof at most.

In a preferred embodiment, the cylindrical housing does not project past the motor housing; especially preferably, the sides of the motor housing and cylindrical housing are arranged so as to be flush with each other. This results in an overall cylindrical unit in which a front portion is occupied by the motor and a rear portion is occupied by the power supply.

For the sake of completeness, it should be noted that the term "cylindrical" does not necessarily mean a circular cross section, but it is preferred that such a circular cross section be at least substantially present.

As a whole, the arrangement according to the invention creates a manageable unit that comprises the power supply and the entire electric motor, particularly including all the electronics for controlling the electric motor and preferably also for managing the energy of the energy-storage cells.

This also results in enhanced maintainability, since all of the components that are essential for operation are locally concentrated, which also reduces the insulation requirements in the previous voltage range due to the more pronounced encapsulation of the voltage-conducting components. For example, it is possible to change out the entire drive system in practically any workshop.

In a preferred embodiment, according to the invention the cylindrical housing has a plurality of seats in which energy-storage cells are or at least can be received. Particularly if a shaft passage is not provided, these seats can fill out the cross section of the cylindrical housing practically completely.

For example, the seats can be cylindrical, so that commercially available battery cells with standardized overall dimensions, such as those known from rechargeable laptop batteries, can be received therein. The seats are preferably oriented such that they extend axially. Preferably, the battery cells can be arranged in both possible installed positions (differing by 180°), which facilitates the desired electrical wiring.

In accordance with the invention the cylindrical housing is subdivided in order to form subunits. On the one hand, this results in greater maintainability and reduction of costs when for example defective parts have to be replaced.

On the other hand, however, the possibility is opened up of interconnecting the energy-storage cells (battery cells) within a subunit and/or the subunits to one another, whether so as to be electrically parallel or in series or mixed as desired.

For this purpose, according to the invention for example the cylindrical housing can be subdivided into a plurality of disks axially. If the shaft passes through it, the disks form rings to which the following description also applies.

For example, the axial length of each disk can be adapted so as to receive an axially oriented energy-storage cell (battery cell) each exactly in a respective cylindrical seat. The axial length of a disk can be exactly equal to or even (somewhat) less than the axial length of an energy-storage cell. Similarly, the axial length can be adapted to a multiple (at least twice) of the axial length of an energy-storage cell. Each such disk can form a self-contained energy-storage module, particularly with which only the operation of the electric motor can already be possible.

In accordance with the invention the cylindrical housing can be subdivided angularly into at least two segments, preferably four segments. Each segment can have an angular extension of 360°/number of segments. Each such segment extending over the entire length of the cylindrically tubular housing can form a self-contained energy-storage module, particularly with which only the operation of the electric motor can be possible.

Such segmenting is not performed mechanically on the housing, but rather only "logically" and/or electrically through the electrical interconnection of the battery cells arranged in the housing. In the case of four segments, for example, groups of battery cells arranged side by side angularly could thus be provided in a housing of the power supply, each group of battery cells having a dedicated electrical connection, for example in series and/or parallel or mixed. Each group then extends over a 90° peripheral angle or less. As will readily be understood, the segmenting can also be performed mechanically.

The above-mentioned embodiments concerning the subdivision of the cylindrical housing axially (mechanically through disk formation) and angularly (at least logically/electrically, optionally also mechanically) can also be especially preferably combined, so that each above-described disk can be subdivided angularly into at least two (at least logical/electrical) segments, preferably into four segments. Each (disk) segment, in turn, can have an angular extension of 360°/number of segments.

Here, the total number of all (at least logical/electrical) segments arranged in succession axially at a common angular position, particularly through electrical interconnection, can form an energy-storage module, particularly with which along the operation of the electric motor can be possible. This results in a number of energy-storage modules that corresponds to the number of segments (per disk).

In such a construction, the housing of the power supply thus has an overall number of subunits that corresponds to the number of disks multiplied by the number of segments per disk. A corresponding variety of possible electrical interconnections can be set up in this way. At the same time, there is preferably a mechanical subdivision at least into the number of disks.

In another preferred embodiment of the above-described construction, at least one interconnection board is between two respective disks axially adjacent. Each disk can have its own interconnection board associated with it. The interconnection board can also be segmented only electrically into the number of logical and/or electrical segments per disk, or there can be a plurality of interconnection boards, preferably provided in segment form, the number of which corresponds to the number of segments. Through such an interconnection board, the energy-storage cells of a disk or of each segment can be contacted to one another in a disk, for example connected in series or all connected in parallel or subdivided into groups, with it being possible for the energy-storage cells to be interconnected differently in different groups (series or parallel) or, if the same interconnection is selected in the various groups, they can be oriented differently in terms of their installed position.

A respective interconnection board can also perform the interconnection between the two axially adjacent disks and/or axially opposing segments, for example connecting them in series or again in parallel.

With the interconnection boards, the energy-storage cells of at least one subset, preferably of all (at least logical/electrical) segments aligned at a common angular position, can be connected electrically in series.

In one possible embodiment, a voltage is produced over the axial length of all segments at the same angular position that corresponds to the total voltage in the energy-storage cells used in the segments. In this embodiment, in contrast, the pole would lie on different axial ends.

In a preferred embodiment, two groups of energy-storage cells are for example formed in each (at least logical/ electrical) segment, with the energy-storage cells connected in parallel in each group. One group can be radially on the inside and one radially on the outside, for example. The energy-storage cells can be preferably oriented in their installed position so as to differ by 180° in the respective groups.

This can open up the advantage of connecting in series, axially beyond the segments at a common angular position, the energy-storage cells of one group that are connected in parallel and the energy-storage cells of the other group that are connected in parallel, thus making the two poles accessible on the same axial side, particularly on the side on which, according to the following embodiments, at least one control board is provided, for example with power electronics and pulse inverter.

All segments (of the disks) lying in axial succession at a common angular position thus form, in turn, an energy-storage module with poles that are accessible on one side, somewhat in the manner of a battery pack in the cross-sectional form of a circular segment.

In one embodiment, the voltages summed up axially by series connection that originate from respective segments at different angular positions can be connected electrically in parallel, with the effect that essentially the same voltage remains but the capacity of the overall energy store is increased. An "overall battery" is produced in this embodiment by all of the logically/electrically segment-shaped energy-storage modules.

In an embodiment that is preferred to this, the energy-storage modules formed are not connected in parallel, but rather each one forms a respective standalone functional module, each in conjunction with its own electronics on a control board, and each of which alone is sufficient to operate the motor. For this purpose, the electronics have a pulse inverter and switch for energizing the stator. This results in a number of functional modules that corresponds to the number of segments (per disk). For this, dedicated electronics can be associated with each segment of the housing of the power supply on a control board, which electronics can be geometrically segmented on a single control board, or there can be a plurality of segment-shaped control boards, each of which for example is associated with a respective segment of the housing.

This also creates a redundancy, since a drive system of this type is ready for operation even if, for example, a logical/electrical segment of a disk or even all of the segments lying in succession at a common angular position (and thus a functional module) malfunction, since that does not cause the operating voltage and the stator control to be eliminated. Instead, only the charging capacity is reduced, which only means reduced range for an automobile.

Electronics can be provided that check the functioning of each functional module and shuts it down completely if a defect is identified. The remaining functional modules remain ready for operation, so the drive system as a whole does as well, merely with a reduction in range and torque.

The shape of an interconnection board is preferably adapted to the shape of the respective disk or segments thereof, preferably such that, while it is congruent in shape to the disks/segments, it is somewhat smaller in order to be enclosed by the disks/segments without the interconnection board being accessible from outside the housing of the power supply, at least not without separating the disks or segments thereof, which are preferably interconnected in any embodiment so as to be flush and contacting in the operating state, axially from one another. For example, the interconnection board can thus have the shape of a circular disk or circular segment. The interconnection board(s) can have contacts in at least one position, preferably on its outer periphery, in order to be electrically connected to other components, such as to the board described below. It is possible to locate such contacts in a plurality of angularly equispaced positions on the periphery, for example in a number that corresponds to the number of the at least logical/electrically and optionally also mechanically separated segments in a disk.

In one development according to the invention, an axially extending board can be provided in at least one radially outside region of the cylindrical housing, particularly in at least one groove that extends in the outer side, which board particularly extends substantially over the entire axial length of the cylindrical housing of the power supply, with this board being preferably electrically connected to each interconnection board between two disks that are axially adjacent. This board can be electrically connected to each above-described interconnection board between two disks that are axially adjacent.

This board can preferably comprise electronics for energy-storage cell management, particularly for checking the cell voltages that are particularly lined up in each segment or in all segments at a common angular position. This board and the electronics thereof can also be provided in order to perform the aforementioned functional testing.

If a subdivision is made into segments of a logical/ electrical or also mechanical type, according to the invention a number of boards can be provided that corresponds to the number of segments.

Independently of the various possible embodiments, in accordance with the invention the voltages generated by, in, and with the disks or segments thereof after series and/or parallel connection of the energy-storage cells contained therein are used to form the phase voltages for the motor with at least one set of control electronics.

Such control electronics can be formed by electronic components on at least one control board between the oppositely situated front faces of motor housing and housing of the energy supply unit. This at least one control board can be provided in a dedicated disk-shaped or even segmented housing part that does not itself comprise any battery cells and that is between the motor housing and the first disk comprising the first axially adjoining battery cells.

The front-side arrangement has the advantage that the stator-side phase terminals of the electric motor can be inserted axially into this at least one control board.

While covering, at least partially, the axial front faces of the power supply (more particularly the housing thereof) and the electric motor, the at least one control board can be arranged and set up so as to distribute the power from the power supply to the stator current feed system of the electric motor, particularly in a controlled or regulated manner.

Preferably, a dedicated control board or a similarly segment-shaped portion of a single control board is associated with each and every at least angularly extending logical/ electrical segment of the cylindrical housing of the power supply or with all of the respective segments of disks disposed in succession (energy-storage module) that are at a common angular position, which control board particularly has the overall shape of a circular disk and is connected to the stator current feed system, particularly each segment on a part of the stator current feed system that extends over the same angular range as the respective segment.

Together with the respectively associated control board or segment thereof, the energy-storage module thus forms the previously mentioned functional module, that is, a ready-for-operation unit for operating the motor.

The at least one control board, particularly the segments thereof, can form overall power electronics for controlling the electric motor at which the respective voltages are, particularly the sum voltages from the segments that are arranged in axial succession at a common angular position. This enables the advantage mentioned above to be achieved, namely that the electric motor can be operated with only the power of the segments at a single common angular position, since the overall power electronics are formed by a sum of individual sets of power electronics, each of which is capable of operating the motor. Each set of power electronics preferably comprises a pulse inverter.

A very especially preferred embodiment of the invention is that the stator current feed system of the electric motor can be formed by a plurality of energizable rods that extend axially through the stator of the electric motor and are connected at one of their ends to a common short-circuit ring and at the other end to a control board, particularly a control board of the aforementioned type, that is between motor and power supply.

Here the rods can be associated with a number of greater than three phases, preferably at least 20 phases, more preferably at least 30 phases. What can be achieved through this significant increase in the number of phases compared to the prior art is that the difference in voltage between two phases or a phase and ground is less than or equal to 60 V. This results in the advantage cited above that the insulation requirements are substantially diminished, whereby the overall construction is simplified and more economical compared to the prior art.

Even though it is preferred in this embodiment that the stator have rods, since the groove fill factor in the stator is improved compared to coils, such an increase in the number of phases can also be achieved in principle with wound stator coils and is also included by the invention.

The preferred use of rods also results in the advantage that lower motor inductances are produced, so that the reduction in the phase voltages is conducive to controlling the speeds at which the voltages rise.

The switches of the control board(s) or segments thereof for feeding current to the phase terminals of the stator can be preferably MOSFETs, particularly if the operating voltage is reduced to less than 60 V. The switches are preferably operated in a half-bridge configuration, in which case each half-bridge can supply one rod of the motor.

In a simple embodiment of the invention, the stator current-feed system can be operated with an electrical ground and a positive supply voltage. However, in a preferred embodiment the short-circuit ring on the side opposite the power electronics/control board(s) can be connected to ground and the rods connected between two symmetrical voltages around the ground. In this way, each rod can be supplied with current individually and independently of the other rods.

In a preferred embodiment, the magnetic pole pair number in the rotor of the motor is selected to as to be equal to the number of (at least logical/electrical) segments lying angularly with it being possible for all of the segments that are arranged in axial succession at a common angular position to be interconnected to a cooperating subunit, thus preferably forming an inherently standalone power supply assembly of the entire power supply.

The power electronics are also subdivided into a corresponding number of subunits, as explained above with reference to the plurality of segments of a control board. Instead of a merely "logical" or "electrical" segmentation, a control board can also be segmented mechanically, that is, formed by a plurality of control board segments.

Units of segments and control board(s) that are arranged spatially at a common angular position can be grouped together into functional modules that operate independently of one another and can therefore be regarded as sub-drive modules, particularly also if they are mechanically interconnected.

Preferably, the torques of the functional modules must add up to a total torque for the drive during operation, but the individual torques of the respective functional units need not necessarily be identical. Beyond just the integration of motor, power electronics, and battery, this concept also offers the following advantages that were suggested above:

1) In the event of a malfunction of a functional module (for example, all of the segments of an angular position in axial succession, their interconnection boards, battery management board, and front-side control board), the remaining functional modules can continue to be operated, which prevents a total system failure and results only in losses of power and/or range;

2) Since battery cells age differently, it is to be expected that different cell capacities will exist over time due to the variance. Within a functional module of the power supply, this variance is preferably compensated for by so-called passive balancing that, to put it simply, means that highly charged cells are discharged to the level of lower-charged cells. Alternatively, the balancing can also be performed actively within a functional module. Thus, power is transferred from excessively charged cells to lower-charged cells by means of inductive or capacitative methods.

However, compensation between the functional modules can also take place by distribution of the total torque to the individual functional modules.

In order to determine the charging state and age of the energy-storage cells/battery cells and to adjust the torque of the motor, one can monitor the current in the power supply, preferably separately in each functional module and in each individual rod.

For this purpose, the housing of the motor can be supplemented by additional sheets having a smaller inside diameter, in which the groove extends to the inside diameter. A Hall sensor can thus be plugged directly from the power electronics into the groove. The sensor is thus incorporated into the magnetic circuit around the respective rod, installed in a magnetically interference-resistant manner, and simultaneously connected via the shortest possible route to the evaluation unit, for example an A/D converter.

Measurement of current in the power supply, preferably each functional module, can be achieved by feedthroughs in the interconnection boards. When current flows over these, this current produces a drop in voltage that is evaluated in the battery management system. The interconnection boards thus serve not only to connect two respective segments that are arranged in axial succession and to lead cell voltages through, but rather also simultaneously perform the task of current detection.

A provision can also be made to additionally provide a central current sensor on the short-circuit ring that measures the current from the short-circuit ring against a reference, such as a vehicle chassis, for example. In the "good case,"

the current measured by this sensor is equal to the sum of the currents through all of the rods, which enables diagnosis of the individual current detection units on the rods to be performed. If the value measured at the sensor does not match with the sum of the rod currents, then an error is diagnosed.

Moreover, when the system is functioning correctly, the current through the sensor on the short-circuit ring is zero.

In order to heat (cool) the system, the heat occurring on the control board(s) in the electric motor and the power electronics can be discharged separately from the heat occurring in the power supply, particularly in the segments and more particularly to ensure that there is as little thermal coupling between the cylindrical housing of the power supply and the other described components as possible. This ensures that the motor heat is not transferred to the power supply and thus cause accelerated degradation of the battery cells.

To this end, the power supply and the electric motor are thermally insulated from one another, particularly by axial spacing, and the housings of the power supply and of the electric motor are preferably connected only by bars that thus make a static connection possible but permit relatively little heat transfer.

Particularly in conjunction with the thermal decoupling, but also independently thereof, the cylindrical housing of the power supply, particularly each disk, can be able to be plugged or pushed axially onto guide rods that extend axially from a front face of the electric motor. The disks, or, in the case of mechanical segmenting, the corresponding segments, have axial passages for this purpose whose orientations correspond to the positions of the guide rods.

The electric motor and the power supply preferably each have a dedicated and independent heat-dissipation system, preferably in the form of heat pipes that extend axially through the electric motor and/or the power supply, preferably in respective grooves provided on the outer surfaces of the housing and power-supply housings. Heat from the motor and power supply is preferably transported to opposite ends. Preferably, the heat dissipation of the power electronics on the at least one control board is effected via the heat pipes in the motor.

A thermally insulating material can be installed between the housing of the power supply and motor, particularly in the aforementioned distance range. Optionally, a disk-shaped housing part holding the control board can be designed to have a thermally decoupling effect, being made of plastic, for example, and thus constitute the insulating material.

In another embodiment of the invention, the heat dissipation from motor and power electronics can also occur via heat pipes, particularly as described above, and heat dissipation from the power supply can be performed by another cooling modus such as for example liquid cooling.

In a preferred embodiment, the heat pipes are in guides on the front end of the motor (facing away from the power electronics) and of the power supply housing (also facing away from the power electronics) and thus form a thermal interface, so that heat discharged axially through the heat pipes can be discharged either by air or liquid cooling.

Standard rotor position sensors based on magnetic induction can be used to detect the rotation angle of the motor. Due to their size, however, they have very limited suitability for such a compact system, so other technical solutions appear to be advantageous here.

It appears advantageous detect the rotation angle by a permanent magnet mounted on the shaft and a board lying above it, this rotation angle sensor mounted for example on the front-side control board.

While 360° Hall sensors merit consideration for this, 360° magnetoresistive sensors based on the GMR or TMR effect appear to be especially advantageous. Due to the symmetry of the system with an even pole pair number in the rotor and a corresponding number of power supplies (functional units) and power electronics units (control boards), it is also possible to use a 180°-rotation angle sensor instead of a 360°-enabled rotation angle sensor. This enables the use of AMR (anisotropic magnetoresistive effect) angle sensors that are especially cost-effective and resistant to interference fields.

A preferred embodiment of the invention is described with reference to the figures that follow:

FIG. 1 shows an electric drive system according to the invention with an electric motor 1 and a power supply 6 that is axially adjacent the electric motor.

The power supply 6 is in a cylindrical housing that is here subdivided mechanically axially into a plurality of disks 6a. The disks 6a are pushed onto guide rods 5 that extend axially away from a motor front end.

Each disk can be subdivided logically or with respect to the circuitry embodied therein into disk segments 7 that are here separated by the wide groove 13. Each segment is at an angular position that extends here over an angular range of 90°, since a subdivision into four segments angularly has been performed. However, the segmenting is not performed mechanically here, meaning that each disk 6a forms a mechanical unit. In principle, however, it is also possible to also perform the segmenting mechanically.

Figure 2:
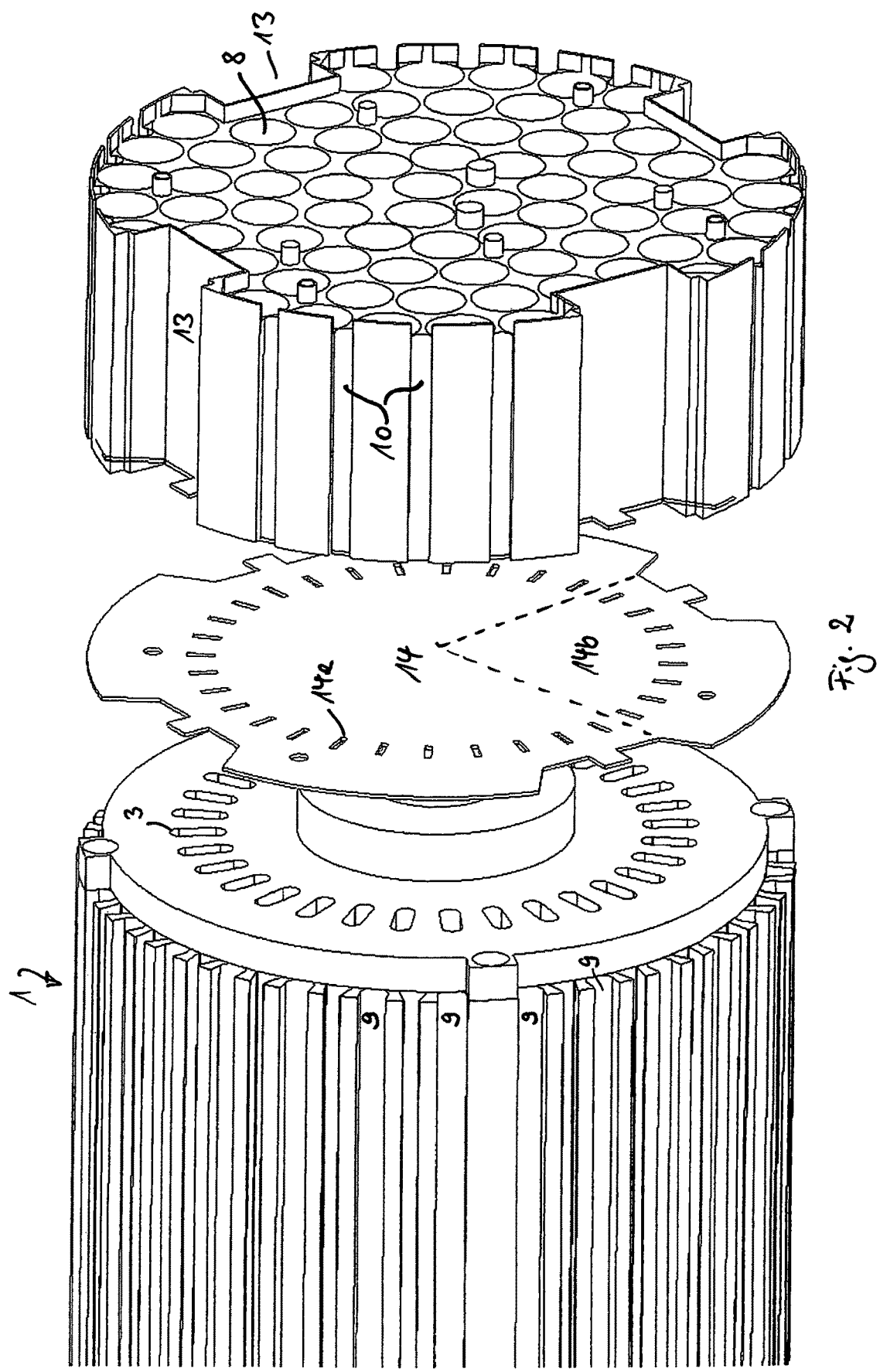

Here standardized battery cells are used in the cylindrical seats 8 in order to form the power supply of the motor, as shown in FIG. 2. This FIG. 2 also shows stator front-side passages 3 in which a rods (not shown) are disposed in order to energize the stator. Each one or a plurality of the rods can be preferably associated with a phase, particularly with a phase voltage of less than 60 V in each case.

Heat pipes can be in the grooves 9 in order to transfer heat occurring in power electronics of the control board 14 and the heat of the motor 1 to the end of the output shaft that is not shown here. The control board has corresponding terminals 14a for the rods.

The disks 6a can also have grooves 10 on the outside in which heat pipes can be disposed for the purpose of heat transport.

FIG. 1 also shows that interconnection boards 11 (particularly at least one) can be provided between two adjacent disks 6a, particularly between each pair of two adjacent disks 6a in order to perform the interconnection of the battery cells within a disk or the logical/electrical segments 7 thereof and between the adjoining disk 6a or its segments 7. For example, all of the battery cells contained in the disks or their segments can be connected in series in this way. Segmentation can be performed such that each segment also has a dedicated respective board.

On the outer periphery, the interconnection board 11 has a plurality of contacts 12 that can be connected to a board (not shown here) that can be located in the groove 13 that extends axially and is in the outer side of each disk 6a. In performing a segmentation, boards can be provided in the number of segments that are then preferably arranged between two respective segments 7 following one another angularly. Here, the board (not shown) can manage the battery formed by the battery cells.

The control board 14 shown in FIG. 2 comprises power electronics, preferably a set of power electronics 14*b* arrayed in a segment-like manner for each logical segment for the purpose of controlling the rods 3 of the stator that are disposed in the same angular range of the logical segment in the board 14.

Here, the control board 14 covers a portion of the front end of the motor 3 and substantially all of the front end of the last and first disk 6*a*.

Together with the control board 14, more particularly segment 14*b* thereof, the overall arrangement shown here of all of the logical segments 7 of a respective common angular position that are arranged in axial succession with the battery cells and boards contained therein forms a functional unit with which only the electric motor can be operated.

The four functional units in this example form a power supply in terms of the invention that extends angularly over a full 360°, particularly forming, in addition, a four-fold redundancy in the process.

The invention is not limited to the four-fold segmentation shown here. There can be more and fewer segments.

Figure 3:
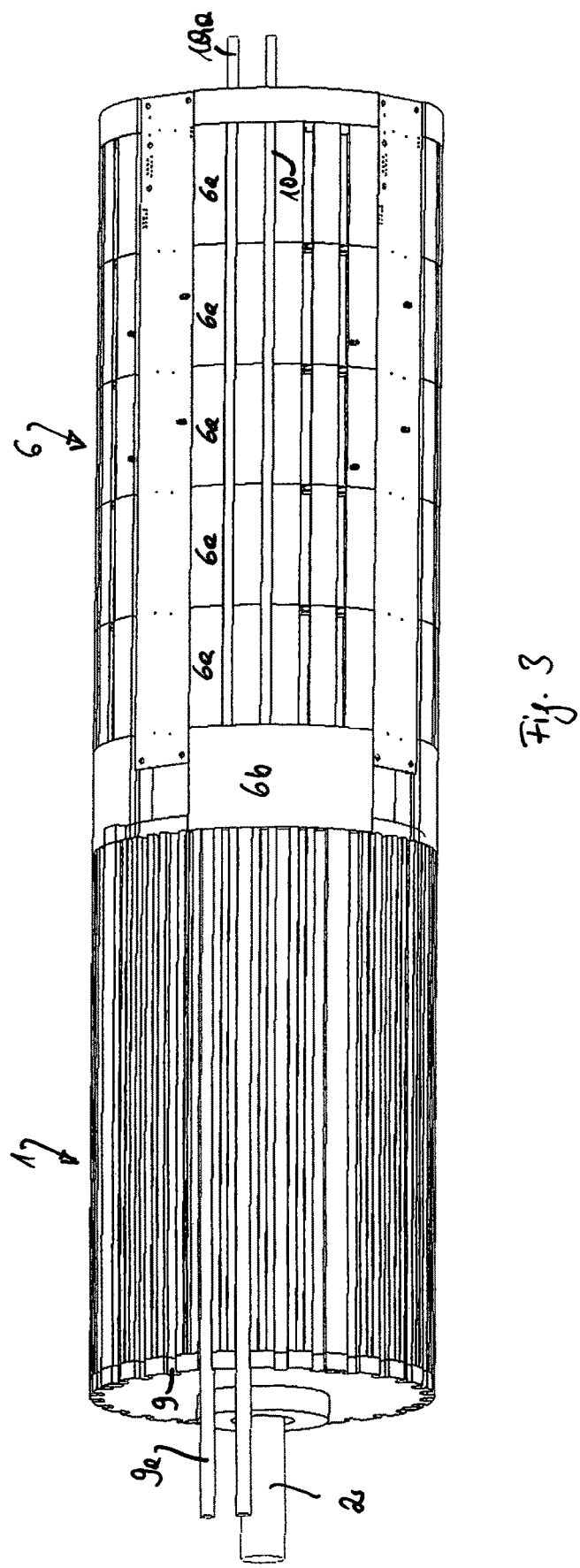

FIG. 3 shows an overview of an entire system with the motor 1 whose shaft 2 and power supply 6 that is opposed axially next to the motor 1 in a housing composed of a plurality of disks 6*a*. These can be secured to the motor by an intermediate plate 6*b* that encloses the control board(s) of the power electronics.

The invention claimed is:

1. In an electric drive system comprising:
    an electric motor having a stator with a current-feed system and an output shaft defining a rotation axis;
    a power supply axially adjacent the electric motor and around the rotation axis of the electric motor circumferentially, and
    a plurality of energy-storage cells in the power supply, the improvement wherein:
    the power supply is cylindrical and formed by a plurality of axially adjacent disks each in turn subdivided angularly into a plurality of segments each formed with a plurality of axially extending cylindrical seats each holding a respective one of the energy-storage cells, each seat being aligned axially with the seats of adjacent disks;
    each segment is aligned axially with a respective one of the segments of adjacent disks and forms therewith a respective energy-storage module extending a full axial length of the power supply, independent of the other energy-storage modules, and capable of powering the motor;
    a control board between opposing axial end faces of the electric motor and of the power supply; and
    respective power electronics on the control board each connected between a respective one of the energy storage modules and the current-feed system of the electric motor.

2. The electric drive system defined in claim 1, wherein the power supply and the motor each have a housing, the power supply housing being on an axial end of the motor housing opposite the motor output shaft.

3. The electric drive system defined in claim 1, wherein the motor output shaft passes through the power supply and the power supply extends angularly all around the motor output shaft.

4. The electric drive system defined in claim 1, wherein the power-supply has a housing that is cylindrical and whose axis is coaxial with the rotation axis of the motor, the cylindrical power-supply housing not projecting radially outwardly past the motor, radially outwardly directed side surfaces of the motor and the power-supply housing being flush with one another.

5. The electric drive system defined in claim 1, wherein each of the disks has an axial length corresponding to that of the energy-storage cells in the respective cylindrical seats.

6. The electric drive system defined in claim 1, further comprising:
    at least one interconnection board between two of the disks that are axially adjacent.

7. The electric drive system defined in claim 6, wherein, the at least one interconnection board electrically connects the energy-storage cells in series in groups spaced apart according to the respective segments in the disk angularly.

8. The electric drive system defined in claim 6, further comprising:
    a further board that extends axially in at least one radially outside region of a cylindrical housing of the power supply in at least one groove, the further board extending substantially over the entire axial length of the cylindrical power-supply housing, the further board being electrically connected to each interconnection board between two disks that are axially adjacent.

9. The electric drive system defined in claim 8, wherein the further board comprises electronics for energy-storage cell management and for checking cell voltages of each segment or in all at least logical/electrical segments of the disks at a common angular position.

10. The electric drive system defined in claim 1, wherein the stator current feed system is formed by a plurality of energizable rods that extend axially through the stator of the electric motor and are connected at one of their ends to a common short-circuit ring and at the other end to the control board.

11. The electric drive system defined in claim 2, wherein the stator current feed system has a plurality of current feed units associated with a number of greater than three phases with the difference in voltage between two phases or a phase and ground being less than or equal to 60 V.

12. The electric drive system defined in claim 1, wherein, in a cylindrical housing of the power supply, each disk is able to be plugged or pushed axially onto guide rods that extend axially from the front face of the electric motor.

13. The electric drive system defined in claim 1, wherein the power supply and the electric motor are thermally insulated from one another by axial spacing and housings of the power supply and of the electric motor are connected only by bars or guide rods.

14. The electric drive system defined in claim 13, wherein the electric motor and the power supply each have a dedicated and independent heat dissipation system in the form of heat pipes that extend axially through the electric motor and/or the power supply for transporting heat to opposite ends.

15. The electric drive system defined in claim 1, wherein at least one groove extends to an inside diameter of a stator in the housing of the motor in which a magnetic field sensor projects from the power electronics of the control board into the groove.

16. The electric drive system defined in claim 1, further comprising, in order to detect a rotation:
    at least one permanent magnet on the shaft of the electric motor whose magnetic field can be detected by a rotation angle sensor mounted on a front-end control board.

17. The electric drive system defined in claim 1, wherein the control board is formed by into a plurality of segmental portions each aligned with a respective one of the energy-storage modules and each carrying a respective one of the power electronics.

18. The electric drive system defined in claim 1, wherein each segment of each disk is formed with a plurality of the seats.

19. The electric drive system defined in claim 1, wherein the disks are identical.

* * * * *